United States Patent Office 3,470,299
Patented Sept. 30, 1969

3,470,299
2-METHYL-COUMARAN-7YL-N-METHYL-CARBAMATE
Rudolf Heiss, Cologne-Stammheim, Ernst Böcker, Leverkusen, Wolfgang Behrenz, Cologne-Stammheim, and Günter Unterstenhöfer, Opladen, Germany, assignors to Farbenfabriken Bayer Aktiengesellschaft, Leverkusen, Germany, a German corporation
No Drawing. Filed May 11, 1964, Ser. No. 366,650
Claims priority, application Germany, June 28, 1963, F 40,104
Int. Cl. C07d 5/36; A01n 9/20, 9/28
U.S. Cl. 424—285        3 Claims

ABSTRACT OF THE DISCLOSURE

Coumaranyl-N-methyl-carbamic acid esters, preparation thereof via a 7-hydroxy-coumarane precursor and the utility thereof as insecticidal agents.

---

The present invention concerns novel N-methyl-carbamic acid esters with an insecticidal and acaricidal activity, as well as processes for their production.

It has already been disclosed that 2-alkoxy-phenyl-N-methyl-carbamic acid esters, for instance 2-isopropoxy-phenyl-N-methyl-carbamic acid ester (cf. German published specification No. 1,108,202), have insecticidal activity. However, like almost all carbamic acid esters, these compounds suffer from the disadvantage that they are very rapidly hydrolysed in an alkaline medium. They cannot, therefore, be applied as a residual dressing on lime-treated surfaces since their activity will be lost within a few days.

It is an object of the present invention to provide novel insecticidal and acaricidal carbamic acid esters. A further object of the present invention is to provide processes for the production of these esters. It is a particular object of the present invention to provide insecticides having a low toxicity towards warm-blooded creatures and low phytotoxicity. Other objects are evident from the following description and from the examples.

It has been found that the novel coumaranyl-N-methyl-carbamic acid esters of the formula

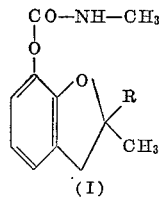

(I)

wherein R denotes hydrogen or methyl, exhibit strong insecticidal and acaricidal properties.

In addition, it has been found that coumaranyl-N-methyl-carbamic acid esters of Formula I are obtained when (a) 7-hydroxy-coumarane of the formula

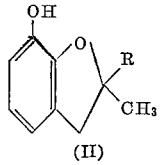

(II)

wherein R denotes hydrogen or methyl, is reacted with methyl isocyanate, or (b) 7-hydroxy-coumaranes of Formula II are, during a first stage of reaction, converted to the chloroformic acid esters with an excess of phosgene and these are then reacted with methylamine during a second stage, or (c) 7-hydroxy-coumaranes of Formula II are during a first stage of reaction converted to the corresponding bis-(7-coumaranyl)-carbonates with an approximately equimolar amount of phosgene and these are then decomposed with methylamine during a second stage.

The compounds according to the invention exhibit an unexpectedly high insecticidal activity and are superior to the previously known insecticides based on carbamates. The high resistance to alkalis of the active agents according to the invention is particularly surprising. They are therefore especially suitable for application on walls freshly treated with lime, such as are for instance encountered in stables.

The reaction according to (a) proceeds in accordance with the formal equation:

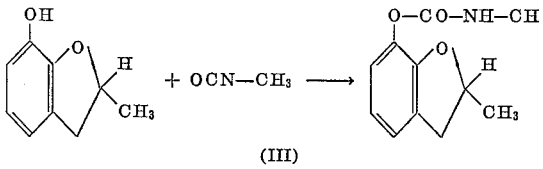

(III)

The reaction may be carried out in an inert solvent. Hydrocarbons such as benzine and benzene are for instance suitable for this purpose, but also ethers such as dioxane. However, it is also possible to react the components directly in the absence of solvents. The reaction is accelerated by the addition of a tertiary amine, for instance triethylamine. The reaction temperatures may be varied within a fairly wide range. In general, the reaction is carried out at between 0 and 150° C.

The second stage of the reaction according to (b) can be represented by the following equation:

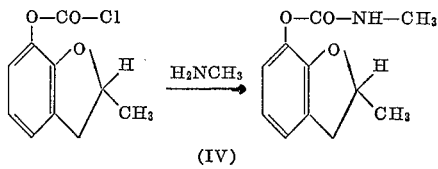

(IV)

During the first stage, the 7-hydroxy-coumarane is converted to the chloroformic acid ester with an excess of phosgene, conveniently in the presence of inert solvents such as aromatic hydrocarbons. A base, and conveniently an alkali metal hydroxide solution, is constantly added dropwise in order to combine with the liberated hydrochloric acid. The pH value should remain below 7. The reaction temperatures may be varied within a fairly wide range. In general, the reaction is carried out at between −10 and +10° C.

During the second stage, the chloroformic acid ester is reacted with an approximately equivalent amount of methylamine. For this purpose, it is convenient to operate in the presence of inert solvents such as aromatic and aliphatic hydrocarbons and ethers, for instance dioxane. The reaction temperatures may again be varied within a certain range. In general, they are between −10 and +10 C.

The second stage of the reaction according to (c) proceeds in accordance with the following formal equation:

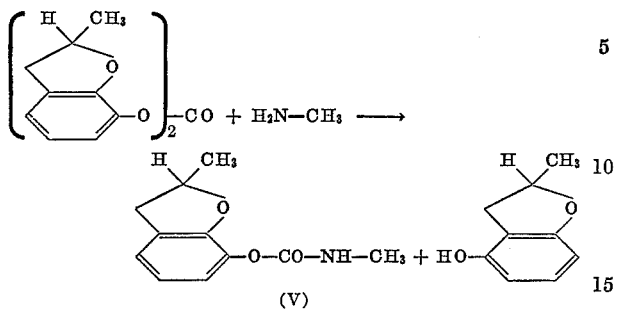

(V)

During the first stage, 7-hydroxy-coumarane is reacted with an approximately equimolar amount of phosgene. For this purpose, it is convenient to operate in the presence of an inert solvent. A base, and conveniently an alkali metal hydroxide, is added in order to combine with the liberated hydrochloric acid. A pH value of 8 is preferably maintained. The temperatures may again be varied within a fairly wide range, and are preferably between 20 and 60° C.

The bis-(7-coumaranyl)-carbonate formed during the first stage is decomposed with methylamine. For this purpose, the operation is conveniently carried out in the absence of a solvent. The most favourable reaction temperatures are between about −10 and +20° C.

The 2-methyl-7-hydroxy-coumarane employed as the starting material for the reactions according to the invention had not previously been described. However, it can be prepared in a simple manner by known methods from the monoallyl ether of pyrocatechol by means of allyl rearrangement and ring closure of the resultant allyl-pyrocatechol. In addition, it is possible to carry out an allyl rearrangement on 2-halogenophenyl-allyl ethers with subsequent ring closure and finally to exchange the halogen for a hydroxy group by known methods. 2,2-dimethyl-7-hydroxy-coumarane is obtained when the corresponding methallyl ethers are employed as the starting material. An example for the preparation of 2-methyl-7-hydroxy-coumarane has been appended to Example 1.

The compounds according to the invention exhibit strong insecticidal and acaricidal activities at a low toxicity towards warm-blooded creatures and a low phytotoxicity. They may therefore be successfully applied for the control of harmful sucking and biting insects as well as of arachnida.

The main representatives of the sucking insects are greenflies such as the peach greenfly (*Myzodes persicae*); scale insects such as *Aspidiotus hederae*; thysanoptera such as *Hercinothrips femoralis*; and bugs such as the beet bug (*Piesma quadrata*) and the bed bug (*Cimex lectularius*).

The main representatives of the biting insects are butterfly larvae such as *Plutella maculipennis*; beetles such as the grain weevil (*Calandra granaria*) as well as species living in the soil such as wire worms (Agriotes sp.); orthoptera such as moths, for instance the German moth (*blattella germanica*), the cricket (*Gryllus domesticus*) and grasshoppers; termites such as *Reticulitermes lucifugus*; and hymenoptera such as ants.

The diptera particularly consist of flies such as the dew fly (*Drosophila melanogaster*), the house fly (*Musca domestica*) and of mosquitoes such as the gnat (*Aedes aegypti*).

Among the arachnida, special importance attaches to the spider mites (Tetranychidae) such as the common spider mite (*Tetranychus telarius*); gall mites such as the currant gall mite (*Eriophyes ribis*) and *Tarsonemus pallidus*; as well as to ticks such as leatherjackets.

The compounds according to the invention may be employed on their own or in the form of the usual compositions, such as emulsifiable concentrates, spray powders, pastes, soluble powders, dusting agents and granulates. These are prepared in known manner (cf. Agricultural Chemicals, March 1960, pages 35–38). The following can be mainly considered as assistants for this purpose: solvents such as aromatic hydrocarbons (for instance xylene), chlorinated aromatic hydrocarbons (for instance chlorobenzenes), paraffins (for instance petroleum fractions), alcohols (for instance methanol), amines (for instance ethanolamine) and water; carriers such as natural ground minerals (for instance kaolins, chalk) and synthetic ground minerals (for instance highly dispersed silicic acid); emulsifying agents such as non-ionic and anionic emulsifying agents (for instance poly-ethylene oxide esters of fatty acids, alkyl sulphonates) and dispersing agents such as lignin.

In these compositions, the active agents according to the invention may also be present in the form of mixtures with other known active agents.

In general, the compositions contain between 0.1 and 95 percent of the active agent, preferably between 0.5 and 90 percent by weight.

The compounds according to the invention may also be applied in the form of poisoned bait. For this purpose, they are mixed with flour, sugar, powdered milk or powdered egg or with dried yeast.

The active agents according to the invention or their compositions may be applied by the usual methods, for instance by watering, spraying, atomising, vapourising, smoking, dispersing or dusting.

The following examples are given for the purpose of illustrating the insecticidal properties of the active agents of the present invention.

Example A.—$LT_{100}$ test on diptera

Test species: house fly (*Musca domestica*) and gnat (*Aedes aegypti*). Solvent: acetone.

1 part by weight of the active agent is taken up in 100 parts by volume of solvent. The resultant solution is diluted to the desired lower concentrations by means of more solvent.

5 ml. of the solution of the active agent are then pipetted into a Petri dish. A filter paper with a diameter of about 9.5 cm. is on the bottom of the Petri dish. The Petri dish is left uncovered until the solvent has completely evaporated. The quantity of active agent per cm.$^2$ of filter paper varies in accordance with the concentration of the active agent in the solution. About 50 specimens of the test species are subsequently added to the Petri dish and they are enclosed by a glass cover.

The condition of the test specimens is continuously observed. The time required for 100% destruction of the specimens is established.

Active agent, concentrations of the active agent and times required for 100% destruction are shown in the following table:

TABLE.—$LT_{100}$ TEST ON DIPTERA

| No. | Active agent | Concentration, as percent | 100% destruction of— House flies | Gnats |
|---|---|---|---|---|
| (1) | 2-methyl-7-coumaranyl-N-methyl-carbamate. | −0.1 | 25 min. | 60 min. |
|  |  | −0.01 | 210 min. | 60 min. |
|  |  | −0.001 | 8 hr. (40%) | 60 min. |
|  |  | −0.0001 |  | 180 min. |

Example B.—Residual test

Test species: house fly (*Musca domestica*) and gnat (*Aedes aegypti*).

Wetting powder base consisting of:

|  | Percent |
|---|---|
| Sodium diisobutyl-naphthalene-1-sulphonate | 3 |
| Spent sulphite liquor, partly condensed with aniline | 6 |
| Highly dispersed silicic acid, containing CaO | 40 |
| Colloidal kaolin | 51 |

In order to prepare a suitable composition of the active agent, 1 part by weight of the active agent is intimately mixed with 9 parts by weight of the wetting powder base. The resultant spray powder is suspended in 90 parts of water.

The suspension of the active agent is sprayed onto surfaces of different materials at a rate of 10 g. per m.$^2$.

The biological activity of the spray coatings is tested at intervals of one week.

For this purpose, the test specimens are applied on the treated surfaces. A flat cylinder, closed with a wire mesh at its upper end, is placed over the test specimens in order to prevent their escape. After the specimens have remained on the surface for 8 hours, the degree of destruction of the specimens is established as a percentage.

The active agents, type of the experimental surfaces and results are given in the following table:

Larvae of *Lymantria dispar*

| Concentration, percent: | Percent destruction after 4 days |
|---|---|
| 0.1 | 100 |
| 0.02 | 100 |
| 0.004 | 100 |
| 0.0008 | 20 |

Example E.—Myzodes test (contact activity)

Solvent: acetone, 1 part by weight; emulsifying agent: 1 part by weight (a polyglycolether); active agent: 2-methyl-coumaranyl-N-methyl-carbamate.

In order to prepare a suitable composition of the active agent, 1 part by weight of the active agent is mixed with the specified amount of solvent, the specified amount of the emulsifying agent is added and the concentrate is diluted with water to the desired concentration.

TABLE.—Residual test

| No. | Active agent | Surface | Test specimen | Week 1 | Week 2 | Week 4 | Week 6 | Week 8 |
|---|---|---|---|---|---|---|---|---|
| (1) | 2-methyl-coumaranyl-N-methyl-carbamate | Lime-coated ceramic | Flies | 100 | 100 | 100 | 100 | 100 |
|  |  |  | Gnats | 100 | 100 | 100 | 100 | 100 |
| (2) | 1-naphthyl-N-methyl-carbamate (known) | Lime-coated ceramic | Flies | 100 | 70 |  |  |  |
|  |  |  | Gnats | 100 | 80 |  |  |  |
| (3) | 2-isopropoxy-phenyl-N-methyl-carbamate (known) | Lime-coated ceramic | Flies | 90 |  |  |  |  |
|  |  |  | Gnats | 100 | 90 |  |  |  |

Example C.—Plutella test

Solvent: acetone, 1 part by weight; emulsifying agent: 1 part by weight (a polyglycolether); active agent: 2-methyl-coumaranyl-N-methylcarbamate.

In order to prepare a suitable composition of the active agent, 1 part by weight of the active agent is mixed with the specified amount of solvent, the specified amount of the emulsifying agent is added and the concentrate is diluted with water to the desired concentration.

White cabbage leaves which had been infested with butterfly larvae (*Plutella maculipennis*) are sprayed with this composition of the active agent until they appear dewy wet.

The degree of destruction is established as a percentage after 4 days. In this connection, 100% indicates the destruction of all caterpillars whilst 0% indicates that none of the caterpillars had been destroyed.

The concentrations of the active agent and results are given in the following table:

Larvae of *Plutella maculipennis*

| Concentration, percent: | Percent destruction after 4 days |
|---|---|
| 0.1 | 100 |
| 0.02 | 100 |
| 0.004 | 90 |
| 0.0008 | 20 |

Example D.—Lymantria test

Solvent: acetone, 1 part by weight; emulsifying agent: 1 part by weight (a polyglycolether); active agent: 2-methyl-coumaranyl-N-methylcarbamate.

In order to prepare a suitable composition of the active agent, 1 part by weight of the active agent is mixed with the specified amount of solvent, the specified amount of the emulsifying agent is added and the concentrate is diluted with water to the desired concentration.

Hawthorn leaves which had been infested with butterfly larvae (*Lymantria dispar*) are sprayed with this composition of the active agent until they appear dewy wet.

The degree of destruction is established as a percentage after 4 days. In this connection, 100% indicates the destruction of all the caterpillars whilst 0% indicates that none of the caterpillars had been destroyed.

The concentrations of the active agent and results are given in the following table:

Savoy cabbage leaves (*Brassica oleracea*) which had been strongly infected with the peach greenfly (*Myzodes persicae*) are sprayed with this composition of the active agent until they appear dewy wet.

The degree of destruction is established as a percentage after 48 hours. In this connection, 100% indicates the destruction of all the greenflies whilst 0% indicates that none of the greenflies had been destroyed.

The concentrations of the active agent and results are given in the following table:

Greenflies *Myzodes persicae*

| Concentration, percent: | Percent destruction after 24 hours |
|---|---|
| 0.1 | 100 |
| 0.02 | 100 |
| 0.004 | 90 |
| 0.0008 | 0 |

Example F.—Ropalosiphum test (systemic activity)

Solvent: acetone, 1 part by weight; emulsifying agent: 1 part by weight (a polyglycolether); active agent: 2-methyl-coumaranyl-N-methylcarbamate.

In order to prepare a suitable composition of the active agent, 1 part by weight of the active agent is mixed with the specified amount of solvent, the specified amount of the emulsifying agent is added and the concentrate is diluted with water to the desired concentration.

Oat plants which had been strongly infested with oat lice (*Ropalosiphum padi*) are watered with this composition of the active agent along their stems so that the composition of the active agent penetrates into the soil without wetting the leaves of the oat plants. The active agent is absorbed by the oat plants from the soil and is thus passed to the infested leaves.

The degree of destruction is established as a percentage after 8 days. In this connection, 100% indicates the destruction of all the oat lice whilst 0% indicates that none of the oat lice had been destroyed.

Oat lice *Ropalosiphum padi*

| Concentration, percent: | Percent destruction after 8 days |
|---|---|
| 0.1 | 100 |
| 0.02 | 100 |
| 0.004 | 40 |
| 0.0008 | 0 |

Example G.—Aerosol test

Test species: *Musca domestica*; solvent: acetone, 99 parts by weight.

In order to prepare a suitable composition of the active agent, 1 part by weight of the active agent is mixed with the specified amount of solvent.

A wire cage containing about 25 test specimens is suspended in the centre of a gas-tight glass chamber of volume 1 m.$^3$. After the chamber has been closed, 2 ml. of the composition of the active agent are dispersed in it. The condition of the test specimens is constantly observed from the outside through the glass walls and the time required for a 50% knock-down effect on the specimens is established.

Active agents, concentrations of the active agents and times required for a 50% knock-down effect are given in the table below the next example.

Example H.—Fumigation test.

Test species: *Musca domestica*; solvent: acetone.
Smoke base consisting of:

|  | Percent |
|---|---|
| Potassium chlorate | 15 |
| Potassium sulphate | 40 |
| Thiourea | 4 |
| Barium carbonate | 15 |
| Silica | 5 |
| Dextrine | 8 |

In order to prepare a suitable composition of the active agent, the desired amount of the active agent is mixed with acetone. 0.5 cc. of the resultant solution is applied dropwise to a tablet of weight about 3 g. which had been pressed from the above smoke base. When the acetone has evaporated, the tablet is taken into a gas-tight glass chamber of volume 1 m.$^3$. A wire cage with about 25 test specimens is suspended in the centre of the chamber. The tablet is ignited and the door of the gas chamber is closed.

The condition of the test specimens is constantly observed from the outside through the glass walls and the time required for a 100% knock-down effect on the specimens is established.

Active agents, concentrations of the active agents and times required for a 100% knock-down effect are given in the following table:

Example 1

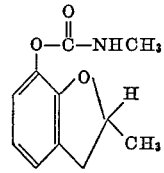

75 g. of 2-methyl-7-hydroxy-coumarane and 30.1 g. of methyl isocyanate are mixed in a 250 ml. flask fitted with a thermometer and caused to react by the addition of 3 drops of triethylamine. At first, the mixture only warms up at a slow rate, but this rate continuously increases. The temperature is maintained at 60° C. by cooling the flask with ice-water. When the evolution of heat has ceased, the reaction product is poured onto a metal sheet, where it soon solidifies. The carbamate can be recrystallized from carbon tetrachloride. It is a colourless powder which melts at 117–118° C.

The 2-methyl-7-hydroxy-coumarane employed as the starting material is prepared by adding 30 g. of 3-allyl-pyrocatechol to 90 g. of a 36.7% solution of hydrogen bromide in glacial acetic acid. After it had been allowed to stand for 12 hours, the reaction mixture is poured into water and the organic phase is taken up in ether. The ether solution is neutralized with potassium carbonate and dried. Ether is evaporated in vacuo from the filtered ether solution. The residue is fractionally distilled. 2-methyl-7-hydroxy-coumarane is obtained at 132–136° C./15 mm. Hg.

Example 2.—2,2-dimethyl-7-coumaranyl-N-methyl-carbamate 3 g. of 2,2-dimethyl-7-hydroxy-coumarane in 3 ml. of ligorin are treated 2 ml. of methyl isocyanate and caused to react by the addition of one drop of triethylamine. The reaction temperature is kept below 45° C. by means of external cooling.

The product soon crystallizes out (yield 2 g.). It is recrystallized from a 5:1 ligroin/dioxane mixture, and then melts at 148° C.

The preparation of the 2,2-dimethyl-7-hydroxy-coumarane employed as the starting material is carried out as follows:

TABLE

| | | (G) Aerosol test | (H) Fumigation test | |
|---|---|---|---|---|
| | | | Concentrations of active agents | |
| Active agents | Test specimens | Percent in solution | Mg. per m.$^{30}$ | LT$_{50}$ |
| (G) 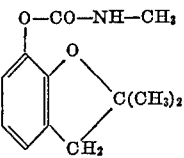 | *Musca domestica* | 1 | 20<br>10<br>5 | 15.5 min.<br>17.5 min.<br>21 min. |
| | | | | LT$_{100}$ |
| (H) 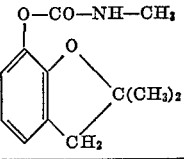 | *Musca domestica* | 1 | 20<br>10<br>5 | 16.5 min.<br>19.5 min.<br>21 min. |

The following serves to illustrate the preparation of the insecticidal agents of the present invention.

110 g. of pyrocatechol mono-(methylallyl ether) are heated to 190° C. The temperature rises to 270° C. without further external heating owing to the heat of reaction. When the reaction has subsided, stirring at 190° C. is continued for half an hour. The reaction product is fractionated in vacuo via a 15 cm. packed column. B.P. 120.5° C. Yield 53 g. (=48.2% of the theoretical).

We claim:
1. A compound of the formula:

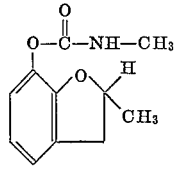

2. A method of controlling insects which comprises contacting them with an effective amount of a compound of the formula:

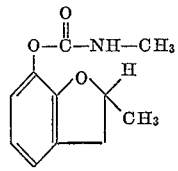

3. An insecticidal composition comprising between 0.1 and 95% by weight of a compound of the formula:

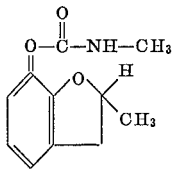

No references cited.

ALEX MAZEL, Primary Examiner
BERNARD I. DENTZ, Assistant Examiner

U.S. Cl. X.R.
260—346.2